United States Patent [19]
Kanbara et al.

[11] Patent Number: 5,629,783
[45] Date of Patent: May 13, 1997

[54] ACTIVE MATRIX POLYMER DISPERSED LIQUID CRYSTAL DISPLAY DEVICE WITH FLOURESCENT FILM

[75] Inventors: Minoru Kanbara, Hachioji; Tetsushi Yoshida, Sagamiko-machi; Zenta Kikuchi, Hamura; Jiro Takei, Tama, all of Japan

[73] Assignee: Casio Computer Co., Ltd., Tokyo, Japan

[21] Appl. No.: 317,230

[22] Filed: Oct. 3, 1994

[30] Foreign Application Priority Data

| Oct. 5, 1993 | [JP] | Japan | 5-249103 |
| Oct. 5, 1993 | [JP] | Japan | 5-249105 |
| Oct. 5, 1993 | [JP] | Japan | 5-249106 |
| Oct. 5, 1993 | [JP] | Japan | 5-249110 |
| Oct. 5, 1993 | [JP] | Japan | 5-249111 |
| Oct. 14, 1993 | [JP] | Japan | 5-256959 |
| Oct. 14, 1993 | [JP] | Japan | 5-256963 |
| Oct. 14, 1993 | [JP] | Japan | 5-256964 |

[51] Int. Cl.⁶ .............. G02F 1/1335; G02F 1/13; G02F 1/135
[52] U.S. Cl. .............. 349/70; 349/89; 349/116; 349/72
[58] Field of Search .................. 359/75, 50, 51, 359/52, 86, 72

[56] References Cited

U.S. PATENT DOCUMENTS

| 3,998,526 | 12/1976 | Katz | 350/160 LC |
| 4,577,098 | 3/1986 | Ogawa | 359/216 |
| 4,684,939 | 8/1987 | Streit | 359/70 |
| 4,688,900 | 8/1987 | Doane et al. | 359/52 |
| 5,146,355 | 9/1992 | Prince et al. | 359/50 |
| 5,394,256 | 2/1995 | Yamada et al. | 359/51 |
| 5,477,359 | 12/1995 | Okazaki | 359/72 |

FOREIGN PATENT DOCUMENTS

| 0121415 | 10/1984 | European Pat. Off. . |
| 0435676A3 | 7/1991 | European Pat. Off. . |
| 5-173116 | 7/1993 | Japan . |
| WO92/14182 | 8/1992 | WIPO . |

OTHER PUBLICATIONS

*English language abstract only. Feinwerktechnik + Messtechnik, vol. 98, No. 1/2, Jan., 1990 Muenchen, De, pp. 17–19, J. Borst, "LCID—Eine Neue, Flussigkristallanzeige".

Fluorescence Activated LCD Feb. 23, 1977 G. Baur and W. Greubel.

*Primary Examiner*—Sara W. Crane
*Assistant Examiner*—Fetsum Abraham
*Attorney, Agent, or Firm*—Frishauf, Holtz, Goodman, Langer & Chick

[57] ABSTRACT

A liquid crystal device includes a TFT or active element substrate on which TFTs and pixel electrodes are arranged in the form of a matrix, a counter substrate having a counter electrode formed thereon and arranged to oppose the active element substrate, a polymer dispersed liquid crystal layer arranged between the active element substrate and the counter substrate and having a polymer resin and a liquid crystal which are dispersed, and a fluorescent film arranged on the pixel electrode. The device displays an image by controlling scattering, absorption, and transmission of light passing through the polymer dispersed liquid crystal layer. The phosphor film converts part of supplied light into fluorescent light having a predetermined wavelength and outputs colored light. Light used for a display is increased in intensity by the fluorescent light emitted from the phosphor film, thereby displaying a bright image.

21 Claims, 13 Drawing Sheets

ACTIVE MATRIX POLYMER DISPERSED LIQUID CRYSTAL DISPLAY DEVICE WITH FLOURESCENT FILM

BACKGROUND OF THE INVENTION

1. Field of the Invention

The present invention relates to an active matrix liquid crystal display device and, more particularly, to an active matrix liquid crystal display device which can provide a bright display.

2. Description of the Related Art

A TN type active matrix liquid crystal display device comprises: a first substrate on which a plurality of pixel electrodes and active elements respectively connected thereto are arranged in the form of a matrix; a second substrate having a counter electrode opposing the pixel electrodes; a frame-like seal member for joining the first and second substrates; a nematic liquid crystal sealed in a space defined by the first and second substrates and the seal member; and polarizing plates arranged to sandwich the first and second substrates.

Aligning films for restricting the aligning direction of liquid crystal molecules are formed on the surfaces of the first and second substrates on which the electrodes are formed. The liquid crystal molecules are twisted/aligned between the first and second substrates at a twist angle of almost 90°. The pair of polarizing plates are arranged such that their transmission axes are almost parallel to each other.

In the TN type active matrix liquid crystal display device, external incident light is linearly polarized by one of the polarizing plates and incident on the liquid crystal layer. Of the light passing through the liquid crystal layer, only light components parallel to the transmission axis of the other polarizing plate emerge therefrom. For this reason, the light amount loss owing to light absorption in the polarizing plates is large, resulting in a dark screen.

This problem is especially conspicuous in a reflection liquid crystal display device having a reflecting plate arranged on the rear side of the device. More specifically, the reflection liquid crystal display device performs a display operation by using natural light or indoor illumination light. That is, the device is designed to use weak light. In addition, light incident on the upper surface side of the liquid crystal display device passes through each of the pair of polarizing plates twice until the light is reflected by the reflecting plate and emerges from the upper surface side. For this reason, the loss of light is large. As a result, the screen becomes extremely dark.

In a transmission liquid crystal display device used with a backlight arranged on the lower surface side, light incident on the lower surface side passes through each of a pair of polarizing plates once until the light emerges from the upper surface side. For this reason, the loss of light in the transmission liquid crystal display device is smaller than that in the reflection liquid crystal display device. However, the brightness of the screen is ½ or less that of illumination light from the backlight.

A conventional color display device colors transmitted light by absorbing light components, of the transmitted light, which have a predetermined wavelength range, thereby displaying a color image. The amount of light absorbed by a color filter is large. Especially in a reflection liquid crystal display device, since light passes through a color filter twice, the display becomes considerably dark.

That is, in a TN type active matrix liquid crystal display device using a color filter, especially the problem of a dark display is posed.

Furthermore, in a conventional active matrix liquid crystal display device, since a capacitor (pixel capacitor) formed by the liquid crystal between each pixel electrode and a corresponding counter electrode is small, a voltage held by each pixel gradually decreases during a non-selection period owing to a leakage current. In order to solve this problem, capacitor electrodes are arranged to oppose the pixel electrodes via a gate insulating film to connect compensation capacitors in parallel to the pixel electrodes. In this method, however, since each capacitor electrode overlaps a corresponding pixel electrode, the opening ratio of each pixel decreases.

SUMMARY OF THE INVENTION

An object of the present invention is to provide a liquid crystal display device having a bright screen.

It is another object of the present invention to provide an active matrix liquid crystal display device which can display a bright image.

It is still another object of the present invention to provide a liquid crystal display device which can display a bright color image.

It is still another object of the present invention to provide a liquid crystal display device having pixels each having a large opening ratio.

In order to achieve the above objects, according to the present invention, there is provided a polymer dispersed liquid crystal device comprising:

a first substrate on which active elements and pixel electrodes connected thereto are arranged in the form of a matrix;

a second substrate having a counter electrode formed thereon and arranged to oppose the first substrate;

a polymer dispersed liquid crystal layer arranged between the first substrate and the second substrate and having a composite layer formed by dispersing a polymer resin and a liquid crystal; and a fluorescent film arranged on one of the first substrate and the second substrate to oppose the pixel electrode.

The fluorescent film may contain at least one of a pigment, a phosphorescent material, and a conductive dopant.

The fluorescent film may include a plurality of fluorescent film sections for emitting fluorescent light of different colors, e.g., R, G, B, or Y, M, C to color light in a plurality of colors, and the plurality of fluorescent film sections for emitting the fluorescent light of the different colors may be sequentially and regularly arranged to oppose the pixel electrodes.

The fluorescent film may be formed on the pixel electrode, between the pixel electrode and the first substrate, or on the counter electrode.

The liquid crystal display device may be of a transmission or reflection type.

If the device is of the reflection type, a reflecting member may be arranged, for example, outside the first substrate or the second substrate, between the pixel electrode and the first substrate, or between the second substrate and the pixel electrode.

If the device is of the reflection type, the pixel electrode, the fluorescent film, and the reflecting member may be stacked on each other.

The pixel electrode or the counter electrode may be made of a reflective, conductive material to serve as both an electrode and a reflecting member.

The liquid crystal may include a dichroic dye.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Liquid crystal display devices according to the preferred embodiments of the present invention will be described below with reference to the accompanying drawings.

(First Embodiment)

A reflection active matrix color liquid crystal display device according to the first embodiment will be described below with reference to FIGS. 1 to 4.

Figure 1:
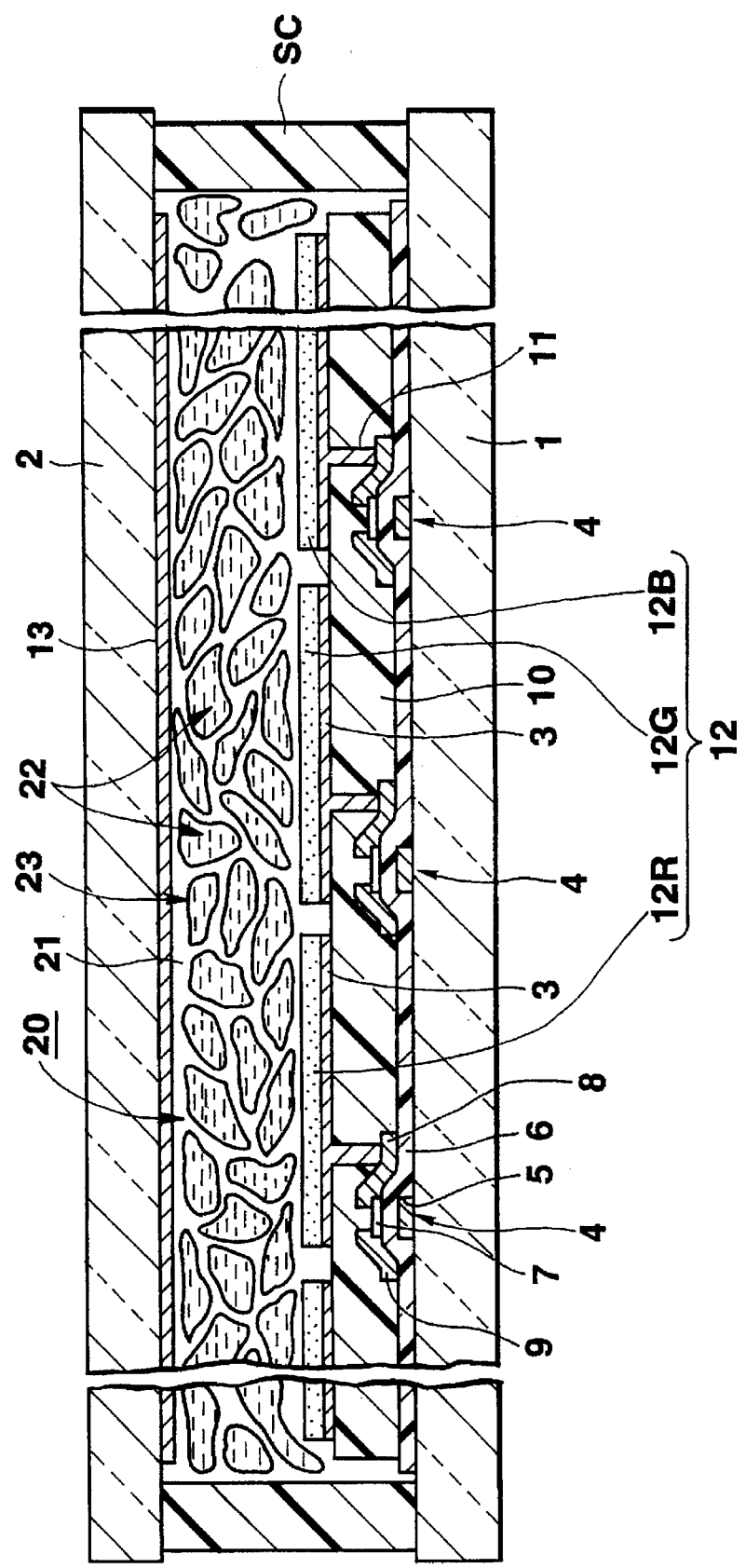
FIG. 1 is a sectional view showing the structure of a reflection active matrix polymer dispersed color liquid crystal display device according to the first embodiment of the present invention.

Referring to FIG. 1, a lower substrate or active element substrate 1 is constituted by an insulating substrate (need not be transparent) consisting of a glass plate or the like. As shown in the plan view of FIG. 2, a plurality of pixel electrodes 3 arranged in the row and column directions and a plurality of active elements 4 respectively connected to the corresponding pixel electrodes 3 are arranged on (or above) the lower substrate 1 in the form of a matrix.

Each active element 4 is constituted by a TFT (thin film transistor).

As shown in FIG. 1, each TFT 4 is constituted by a gate electrode 5 formed on the substrate 1, a gate insulating film 6 having a part covering the gate electrode 5, an intrinsic semiconductor film 7 consisting of a-Si (amorphous silicon) or the like and formed on the gate insulating film 6 to oppose the gate electrode 5, and source and drain electrodes 8 and 9 formed on both sides portions of the intrinsic semiconductor film 7.

Figure 2:
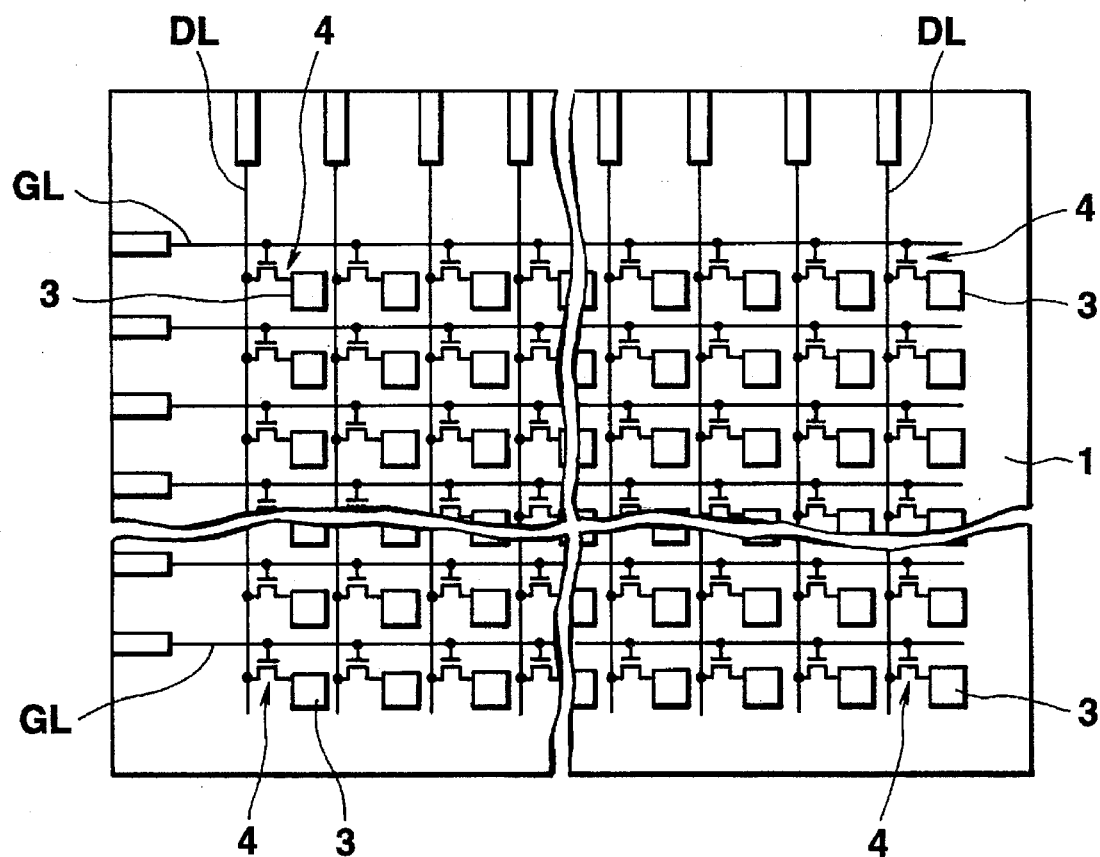
FIG. 2 is a plan view for explaining the arrangement of an active element substrate of the liquid crystal display device shown in FIG. 1.

As shown in FIG. 2, gate lines (address lines) GL each for supplying a gate signal to the TFT 4 and a data lines DL each for supplying a data signal corresponding to image data to the TFT 4 are arranged above the lower substrate 1. The gate electrode 5 of the TFT 4 is integrally formed with the gate line GL, and the drain electrode 9 is connected to the data line DL.

A protective insulating film 10 covering all the TFTs 4 is formed on the side of the lower substrate 1.

Each pixel electrode 3 is formed on the protective insulating film 10 and electrically connected to the source electrode 8 of a corresponding TFT 4 via a contact hole 11 formed in the protective insulating film 10. Each pixel electrode 3 extends from an upper portion of the corresponding TFT 4 to a position near the adjacent pixel electrode 3 to have a relatively large area. The pixel electrode 3 consists of a metal film having a high reflectance, such as Al (aluminum), Cr (chromium), or Ag (silver) and also serves as a reflecting film for reflecting radiated light.

A fluorescent film 12 (film sections 12R, 12G, and 12B) for emitting fluorescent light upon incidence of light is formed on the entire surface of each pixel electrode 3. The fluorescent film 12 includes a plurality of fluorescent film sections for emitting fluorescent light of different colors, e.g., a red fluorescent film section 12R for emitting red fluorescent light, a green fluorescent film section 12G for emitting green fluorescent light, and a blue fluorescent film section 12B for emitting blue fluorescent light. The fluorescent film sections 12R, 12G, and 12B are arranged on the pixel electrode 3 in a predetermined order to allow a full color display.

Figure 3:
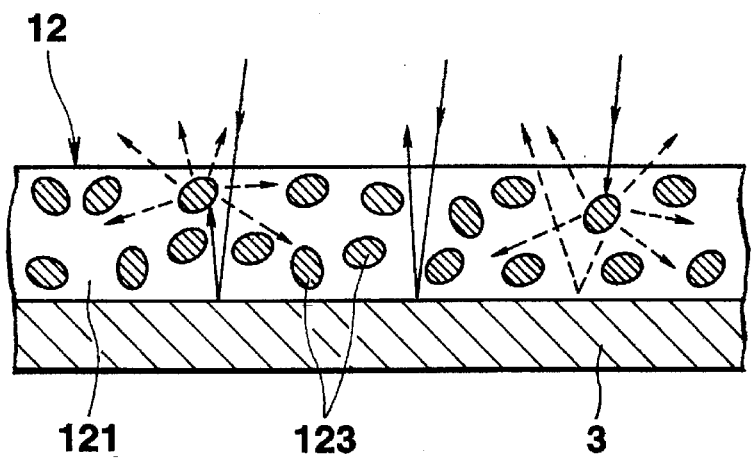
FIG. 3 is a sectional view for explaining the function of a fluorecent film in FIG. 1.

As shown in FIG. 3, the fluorescent film 12 is constituted by a transparent resin base 121 and a granular phosphor material 123 dispersed in the resin base 121.

The resin base 121 consists of a transparent resin such as acrylic resin, vinyl chloride resin, alkyd resin, aromatic sulfonamide resin, urea resin, melamine resin, benzoguanamine resin, or a co-condensation polymer thereof.

The phosphor material 123 is formed by grinding a phosphor member into fine particles. The phosphor member is obtained by dyeing the same resin as that used for the transparent base material 121 or another type of a transparent resin by using a phosphor dye. The phosphor material 123 has a wavelength conversion function of absorbing light having wavelengths other than a specific wavelength range (the wavelength range of fluorescent light emitted from the phosphor material 123) and emitting light with the specific wavelength range by using the energy of the absorbed light.

Therefore, light emerging from the fluorescent film 12 has the same color as that of fluorescent light emitted from the phosphor material 123.

An upper substrate or counter substrate 2 (see FIG. 1) is a transparent substrate consisting of a glass plate, a transparent resin film, or the like. A transparent counter electrode 13 is formed on almost the entire surface of the upper substrate 2 to oppose all the pixel electrodes 3.

The lower substrate 1 and the upper substrate 2 are joined to each other via a frame-like sealing member SC at the peripheral portions of the substrates. A composite film (polymer dispersed liquid crystal film) 20 composed of a liquid crystal and a polymer resin is formed in a region surrounded by the sealing member SC between the substrates 1 and 2.

The composite film 20 has a structure in which a polymer resin 21 and a liquid crystal 22 are dispersed, and more specifically the liquid crystal 22 is confined in spaces (liquid crystal domains) 23 in the polymer resin or layer 21 having a sponge- or network-like sectional structure.

The liquid crystal 22 is of a guest-host type, which consists of a nematic liquid crystal having positive dielectric anisotropy and containing a dichroic black dye at, e.g., about 3 to 15 wt%.

The image display operation of the liquid crystal display device having the above arrangement will be described next with reference to FIGS. 4A and 4B.

Figure 4A:
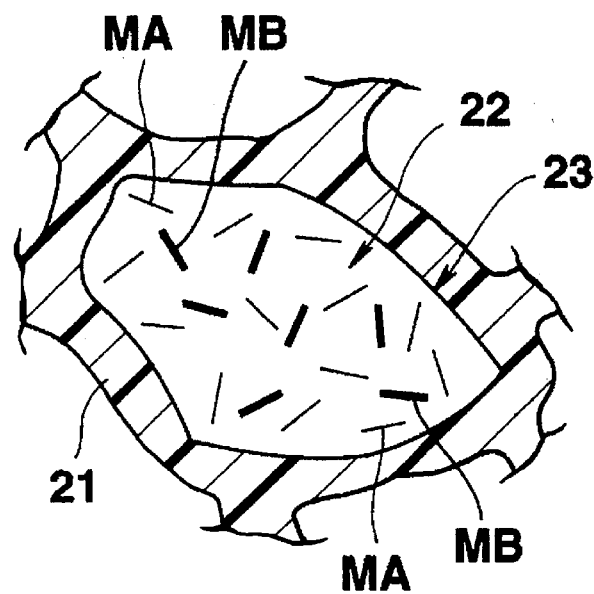
FIG. 4A is a sectional view for explaining the aligned state of liquid crystal molecules and a dichroic dye in the absence of an electric field.

Molecules MA of the liquid crystal 22 dispersed in the polymer resin 21 of the composite film 20 point in various directions while no (electric field) voltage is applied, as illustrated in FIG. 4A. In this state, since the reflectance of the polymer resin 21 is different from that of the liquid crystal 22, light incident from the upper surface side of the liquid crystal display device is scattered at the interface between the liquid crystal domain or portion 23 and the polymer resin 21 upon passing through the composite film 20, and is further scattered by the liquid crystal molecules MA. Molecules MB of the dichroic dye also point in various directions in accordance with the aligned state of the liquid crystal molecules MA. Therefore, most of the scattered light is absorbed by the dichroic dye molecules BM.

For this reason, in the absence of an electric field, only a small amount of light reaches the fluorescent film 12 on (above) the lower substrate 1 and the pixel electrodes 3 thereunder through the composite film 20. Therefore, the amount of fluorescent light emitted from the fluorescent film 12 and the amounts of light reflected by the pixel electrodes 3 are small. In addition, these light components are scattered and absorbed when they pass through the composite film 20, so almost no light emerges from the upper surface side of the liquid crystal display device. Consequently, the resultant display is almost black in a dark state.

Figure 4B:
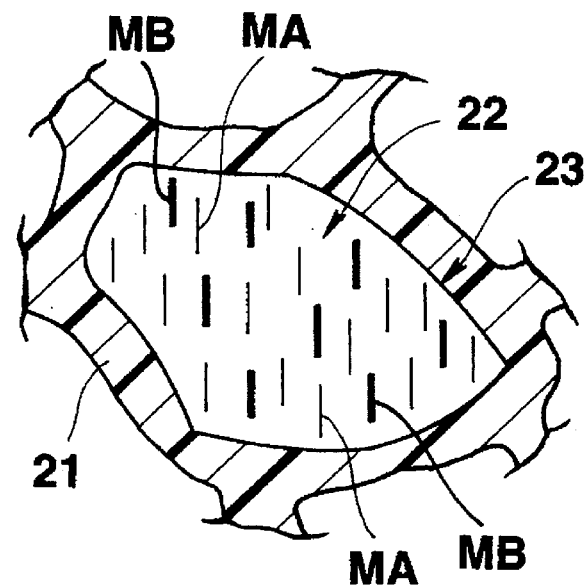
FIG. 4B is a sectional view for explaining the aligned state of liquid crystal molecules and a dichroic dye in the presence of an electric field.

When an electric field is applied between the pixel electrodes 3 and the counter electrode 13, the liquid crystal molecules MA are uniformly aligned along the electric field to be almost perpendicular to the surfaces of the substrates 1 and 2, as illustrated in FIG. 4B. In this state, the refractive index of the polymer resin 21 is almost equal to that of the liquid crystal 22. For this reason, light incident from the upper surface side of the liquid crystal display device is transmitted through the composite film 20 under almost no influences of the light scattering effect of the composite film 20. As the liquid crystal molecules MA are vertically aligned, the dichroic dye molecules MB, as well, are vertically aligned. Therefore, almost no light transmitted through the composite film 20 is absorbed by the dichroic dye.

In the presence of an electric field, therefore, incident light reaches the fluorescent film 12 through the composite film 20.

As indicated by the solid arrows in FIG. 3, light incident from the upper surface side of the phosphor film 12 is transmitted therethrough and reflected by the pixel electrode 3. This reflected light is then transmitted through the fluorescent film 12 again to emerge therefrom. Some light components of the light transmitted through the fluorescent film 12 are incident on the phosphor material 123. Of the light which has been incident on the phosphor material 123, some light components with a specific wavelength range, i.e., light components having the same wavelength range as that of fluorescent light emitted from the phosphor material 123, are transmitted though or reflected by the phosphor material 123. The phosphor material 123 absorbs light components with other wavelength ranges (including ultraviolet rays and the like) and emits light (fluorescent light) having the specific wavelength range by using the energy of the absorbed light.

The fluorescent light emitted from the phosphor material 123 is radiated around the phosphor material 123, as indicated by the broken arrows in FIG. 3. Fluorescent light components propagating to the upper surface of the fluorescent film 12 become light reflected by the fluorescent film 12, whereas fluorescent light com-ponents propagating to the pixel electrode 3 are reflected by the pixel electrode 3 and emerge from the upper surface of the fluorescent film 12. The light com-ponents transmitted through the phosphor material 12 are also reflected by the pixel electrode 3.

Therefore, the light emerging from the fluorescent film 12 is constituted by the light components transmitted through the fluorescent film 12 without colliding against the phosphor material 123, the fluorescent light emitted from the phosphor material 123, and the light components transmitted through/reflected by the phosphor material 123 (the light components having the same wavelength range as that of the fluorescent light emitted from the phosphor material 123). The light which is transmitted through the fluorescent film 12 without colliding against the phosphor material 123 is white light. The total color of the light emerging from the fluorescent film 12 is the same as that of the fluorescent light emitted from the phosphor material 123. Note that the color density of exit light is determined by the mixing ratio of the phosphor material 123 in the fluorescent film 12. The chromaticity increases with an increase in the amount of the phosphor material 123.

As is generally known, in a TFT liquid crystal display device, during a selection period of a given row, a pulse voltage is applied to the corresponding gate line GL to turn on the TFTs 4 on the selected row, and a gradation voltage corresponding to a display gradation level is applied to a drain line DL at the same timing. With this operation, a voltage corresponding to the gradation voltage is held between the corresponding pixel electrode 3 and the counter electrode 13 until the next selection period. Therefore, the liquid crystal display device of this embodiment controls a voltage applied to the drain line DL during each selection period to control the aligned states of the liquid crystal molecules MA and the dichroic dye MB, thereby controlling transmission and scattering of light and displaying an arbitrary image.

In addition, since the red, green, and blue fluorescent film sections 12R, 12G, and 12B are sequentially arranged on each pixel electrode 3, each pixel can be irradiated with red, green, and blue fluorescent light. Therefore, a full color image can be displayed.

As described above, the liquid crystal display device of this embodiment displays an image by using scattering and transmission of light in the composite film 20, and requires no polarizing plate. Since the light amount loss owing to light absorption in a polarizing plate is zero, a bright image can be displayed.

In addition, in this liquid crystal display device, the fluorescent film section is formed on each pixel electrode 3. For this reason, the intensity of exit light is increased by fluorescent light emitted from the fluorescent film 12 to realize a brighter display.

Furthermore, since each pixel electrode 3 serving also as a reflecting film extends to a position near the adjacent pixel electrode 3, the opening ratio of each pixel can be increased.

Moreover, since the fluorescent film 12 includes fluorescent film sections of different colors, a full color image can be displayed. A conventional color filter used as a coloring film transmits only light components, of visible light, which have a specific wavelength range and absorbs light components having other wavelength ranges, thereby coloring exit light. In contrast to this, the fluorescent film 12 (film sections 12R, 12G, and 12B) absorbs visible light and ultraviolet rays having wavelength ranges other than a specific wavelength range, and emits light having the specific wavelength range by using the energy of the absorbed light. For this reason, the intensity of light colored by the fluorescent film 12 is higher than that of light colored by the color filter.

Figure 5:
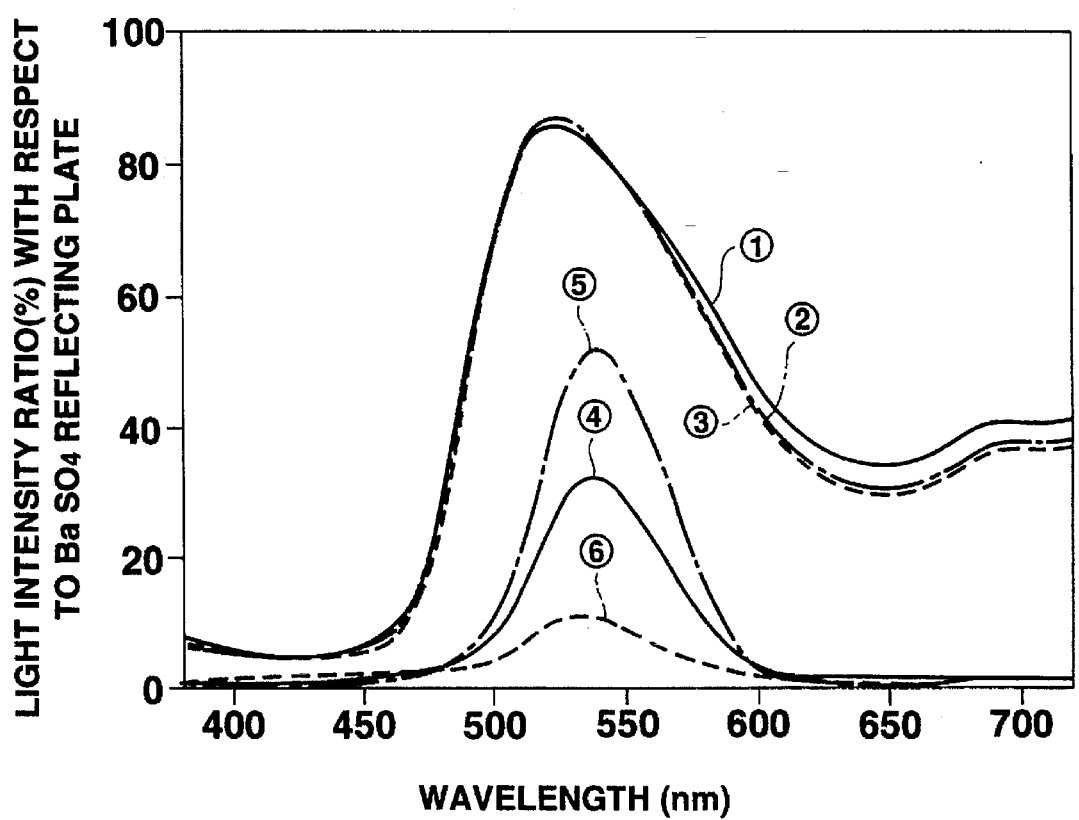
FIG. 5 is a graph showing the spectrum distributions of light emerging from fluorescent films and color filters.

FIG. 5 shows the intensity distribution of light beams, each colored by a layer made of a fluorescent film or a color filter and a reflecting film provided on the lower surface of the fluorescent film or the color filter. Three types of reflecting films were used. They were: an Al film having a roughened surface (hereinafter called "Al roughened-surface reflecting film"); a white reflecting film made of BaSO$_4$ (barium sulfate) and having a light-scattering surface (hereinafter called "BaSO$_4$ reflecting film"); and a reflecting film made of Ag (silver) and having a mirror surface (hereinafter called "Ag mirror-surface reflecting film"). In FIG. 5, curve ① shows the intensity distribution of a light beam colored by a layer made of an Al roughened-surface reflecting film and a fluorescent film. Curve ② indicates the intensity distribution of a light beam colored by a layer formed of a BaSO$_4$ reflecting film and a fluorescent film. Curve ③ represents the intensity distribution of a light beam colored by a layer formed of an Ag mirror-surface reflecting film and a fluorescent film. Curve ④ indicates the intensity distribution of a light beam colored by a layer formed of an Al toughened-surface reflecting film and a color filter. Curve ⑤ shows the intensity distribution of a light beam colored by a layer formed of a BaSO$_4$ reflecting film and a color filter. Curve ⑥ indicates the intensity distribution of a light beam colored by a layer formed of an Ag mirror-surface reflecting film and a color filter.

Note that the fluorescent film used for this measurement of the intensity distributions is a green fluorescent film using a phosphor material FA-22 available from Shinroihi Kabushiki Kaisha. The phosphor material is mixed with the base material at a weight ratio of 60/160. The color filter used is a green color filter formed by coating a material, obtained by mixing a transparent resin material and a green pigment, on a reflecting film, and subsequently hardening the transparent resin material. Both the color filter and the fluorescent film have a thickness of 7.5 μm.

As shown in FIG. 5, the intensity of light emerging from the fluorescent film 12 is much higher than that of light emerging from the color filter. The intensity distribution of exit light with respect to the wavelength hardly changes with the use of any of the following reflecting films: an Al roughened-surface reflecting film, a BaSO$_4$ reflecting film, and an Ag mirror-surface reflecting film.

As described above, light emerging from the fluorescent film 12 is light colored by fluorescent light emitted from the phosphor material 123. The intensity of light colored by the fluorescent film 12 is much higher than that of light colored by the color filter.

Therefore, if a light coloring film composed of the fluorescent film 12 is used for a color liquid crystal display device, as in this embodiment, a color display with a high luminance can be performed by using strong light colored by the fluorescent film 12.

One example of a method of manufacturing the active matrix color liquid crystal display device having the above arrangement will be described next.

First, a metal film is deposited on the lower substrate 1. The metal film is then patterned to form the gate electrodes 5 and the gate lines GL. An insulating film consisting of SiN or the like is deposited on the entire surfaces of the substrate 1 and the metal layers 5, GL by the CVD method or the like to form the gate insulating film 6. An intrinsic semiconductor such as a-Si is deposited on the gate insulating film 6 by the CVD method or the like. This semiconductor film is patterned to form the intrinsic semiconductor films 7 each opposing the gate electrode 5. Thereafter, the source and drain electrodes 8 and 9 which are in contact with the intrinsic semiconductor film 7 are formed. Furthermore, the drain lines DL connected to the drain electrodes 9 are formed.

An insulating material such as SiN is deposited on the entire surface of the resultant substrate 1 by the CVD method or the like to form the protective insulating film 10. As this protective insulating film 10, an SiO$_2$ film may be formed by spin-coating and hardening an organic silanol compound. Alternatively, the insulating film 10 may be formed by spin-coating and hardening a resin solution. The contact hole 11 is then formed in the insulating film 10. A reflecting layer consisting of aluminum or the like is formed on the entire surface of the protective insulating film 10 and is patterned to form the pixel electrodes 3 each connected to the source electrode 8.

A film obtained by mixing a photo-setting transparent resin material for, e.g., the resin base material 121 of the fluorescent film 12 and the phosphor material 123 for emitting a fluorescent light having a predetermined color, e.g., red, at a predetermined ratio is coated on the entire surface of the lower substrate 1 by spin coating, printing, or the like to have a predetermined film thickness. Thereafter, ultraviolet rays or the like are radiated on the transparent resin material to pattern it into a predetermined shape, thereby forming the red fluorescent film section 12R on the corresponding pixel electrode 3. Subsequently, a mixture of a transparent resin material and the green phosphor material 123 is coated on the entire surface of the lower substrate 1, and ultraviolet rays are radiated on the resultant structure to pattern it, thereby forming the green fluorescent film section 12G on the corresponding pixel electrode 3. The blue fluorescent film 12B is also formed in the same manner as described above.

A film consisting of a transparent conductive material such as ITO is formed on the transparent substrate 2 by sputtering or the like. The film is then patterned to form the counter electrode 13.

The lower and upper substrates 1 and 2 are joined to each other via the sealing member SC. A solution mixture of a polymeric material which causes a polymerization reaction when it is irradiated with light and a nematic liquid crystal having a dichroic dye added thereinto is injected and filled between the substrates 1 and 2 via an opening formed in a portion of the seal member SC by a vacuum injection method. Ultraviolet rays are radiated on the solution mixture filled between the substrates 1 and 2 from the upper substrate 2 side. Upon radiation of the ultraviolet rays, a radical polymerization reaction takes place in which the double bonds of the polymeric material in the form of a monomer or oligomer dissociate into radicals, and radicals of adjacent molecules combine. As a result, the polymeric material becomes the polymer resin 21. In the process of this reaction, phase-separation of the polymer resin 21 and the liquid crystal takes place. As a result, the formed polymer resin 21 has a sponge- or network-like sectional structure, and the liquid crystal 22 is confined in spaces in the polymer resin 21, thus forming the composite film 20 composed of the liquid crystal and the polymer resin and having above-described structure. The injection opening formed in the sealing member SC is sealed after the solution mixture is filled or the composite film 20 is completed. Note that this method of forming the composite film 20 is called a photopolymerization phase-separation method.

The reflection active matrix color liquid crystal display device having the arrangement shown in FIG. 1 is completed by the above process.

The above-described manufacturing method is an example, and other manufacturing methods may be employed.

(First Modification)

In the arrangement shown in FIG. 1, each of the fluorescent film sections 12R, 12B, and 12G is arranged on each pixel electrode 3. However, as shown in FIG. 6, a fluorescent film 12 may be arranged on a portion, of a counter electrode 13, which opposes the pixel electrode 3.

Figure 6:
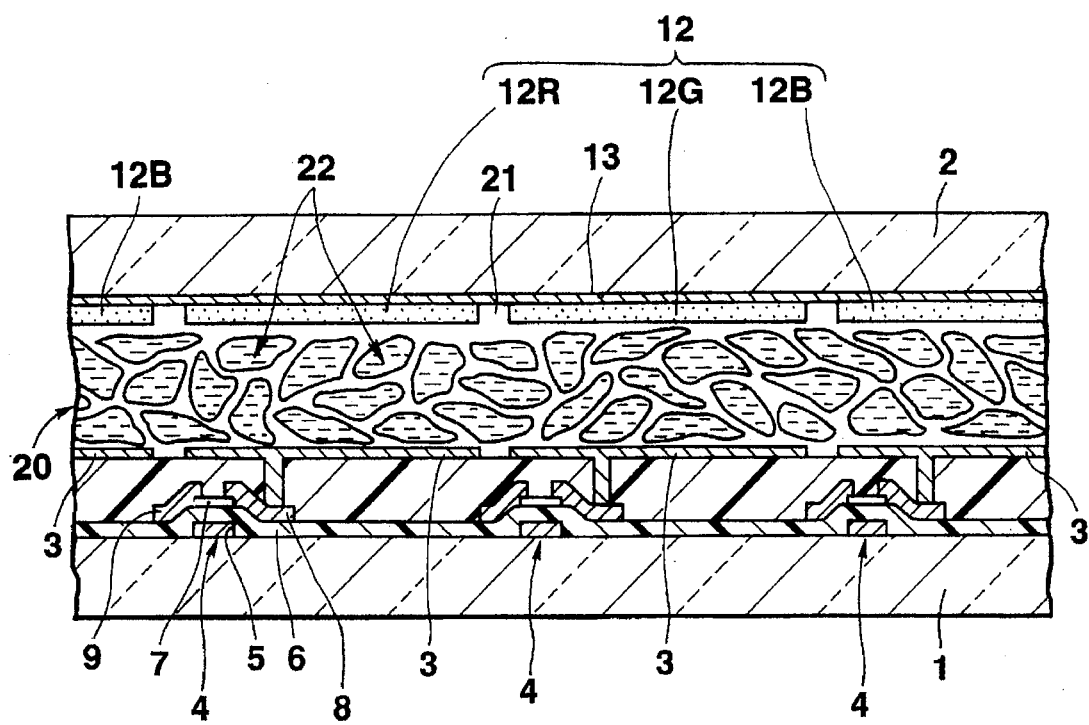
FIG. 6 is a sectional view showing the arrangement of a modification of the reflection active matrix polymer dispersed color liquid crystal display device shown in FIG. 1.

In the liquid crystal display device having the arrangement shown in FIG. 6, while no voltage is applied, light incident from the upper surface side of the liquid crystal display device is scattered and absorbed by a composite film 20, and only a small amount of light reaches the pixel electrode 3. In addition, the light reaching the pixel electrode 3 is reflected by the pixel electrode 3. As a result, most of the light is scattered and absorbed when it passes through the composite film 20 again. Therefore, the display of the liquid crystal display device is set in a dark state.

Note that part of fluorescent light emitted from the fluorescent film 12 upon incidence of light from the upper surface side of the liquid crystal display device emerges from the upper surface side of the liquid crystal display device. For this reason, this fluorescent light is seen from the upper surface side. As a result, the dark display is slightly tinged with the color of the fluorescent light. However, by adjusting the mixing ratio of the phosphor material 123 in the fluorescent film 12, the intensity of fluorescent light emitted by light incident from the upper surface side can be reduced to a predetermined level or lower at which no practical problems are posed.

While an electric field is applied, part of light incident from the upper surface side of the liquid crystal display device is transmitted through the fluorescent film 12, and another part of the incident light causes emission of fluorescent light. The light incident on the composite film 20 reaches the pixel electrode 3 and is reflected by it without any influence of the scattering/absorbing effect of the composite film 20. This reflected light is incident on the fluorescent film 12 to be transmitted therethrough or cause it to emit fluorescent light. Therefore, the intensity of light emerging from the liquid crystal display device in the presence of an electric field is much higher than that in the absence of an electric field.

As described above, with the arrangement shown in FIG. 6, a bright image can also be displayed by controlling transmission and scattering of light and using fluorescent light.

In the arrangement shown in FIG. 6, the fluorescent film 12 (12R, 12B, and 12G) is arranged on the counter electrode 13. However, the fluorescent film 12 (12R, 12B, and 12G) may be directly arranged on the upper substrate 2, and the counter electrode 13 may be arranged on the fluorescent film 12. In this case, the same function and effect as those of the arrangement shown in FIG. 6 can also be obtained.

(Second Embodiment)

In the first embodiment, each pixel electrode 3 also serves as a reflecting film. However, a pixel electrode and a reflecting film may be separately formed.

The second embodiment, in which pixel electrodes and reflection films are separately arranged, will be described below.

Figure 7:
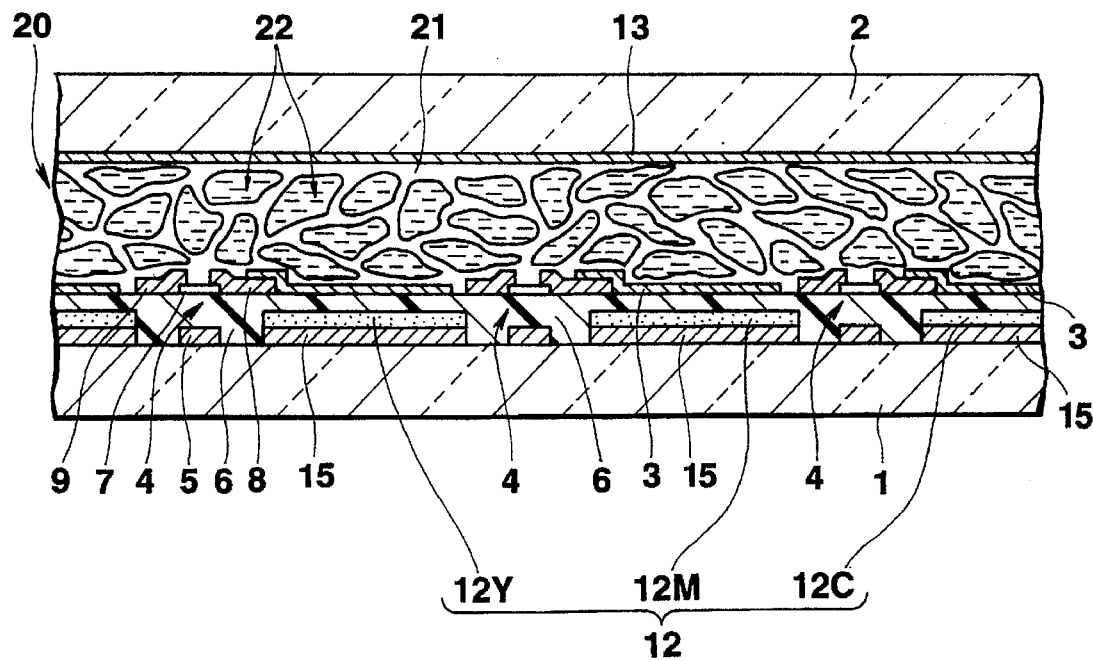
FIG. 7 is a sectional view showing the structure of the portion of a reflection active matrix color liquid crystal display device according to the second embodiment of the present invention.

FIG. 7 shows the sectional structure of the portion of a reflection active matrix color liquid crystal display device according to the second embodiment.

The same reference numerals in FIG. 7 denote the same parts as in FIG. 6.

In the arrangement shown in FIG. 7, each pixel electrode 3 is made of a transparent conductive film consisting of ITO or the like. The pixel electrodes 3 are formed on a gate insulating film 6 and electrically connected to source electrodes 8. Reflecting films 15 opposing the pixel electrodes 3 are directly formed on a lower substrate 1 in the form of a matrix. Each reflecting film 15 is made of an Al roughened-surface reflecting film, a $BaSO_4$ reflecting film, or an Ag mirror-surface reflecting film. If the reflecting films 15, the gate electrodes 5 of TFTs 4, and gate lines GL are made of the same metal film (e.g., an Al film), these elements can be formed at once.

Each of the sections of a film 12 is arranged on each reflecting film 15. In this embodiment as well, the fluorescent film 12 includes an yellow fluorescent film section 12Y for emitting yellow fluorescent light, a magenta fluorescent film section 12M for emitting fluorescent light having a color close to magenta, and a cyan fluorescent film section 12C for emitting fluorescent light having a color close to cyan. The fluorescent film sections 12Y, 12M, and 12C are sequentially formed on the reflecting film 15.

Each reflecting film also serves as a compensation capacitor (storage capacitor) for compensating for a voltage held in each pixel during a non-selection period. Each compensation capacitor is constituted by the reflecting film 15, the pixel electrode 3, and a two-layered insulating film consisting of the fluorescent film 12 and the gate insulating film 6.

Reference potential lines to which a reference potential (e.g., a ground potential) is applied are arranged on the substrate 1 in correspondence with the respective rows of the pixel electrodes 3 to be parallel to the gate lines GL. The reflecting film 15 of each row is connected to the corresponding reference potential line. This reference potential line is also made of the same metal material as that for the reflecting film 15, the gate electrode 5, and the gate line GL.

A phosphor material used for the yellow fluorescent film section 12Y can be obtained by using, e.g., a phosphor dye whose color index number is "C. I. 56205" or "C. I. 46040". Upon irradiation of only ultraviolet rays, the dye "C. I. 56205" emits fluorescent light whose color ranges from green to yellowish green; and the dye "C. I. 46040", fluorescent light whose color ranges from yellowish green to yellow. Under daylight, the color of fluorescent light emitted from both the dyes is yellow.

A phosphor material used for the magenta fluorescent film section 12M can be obtained by using, e.g., a phosphor dye whose color index number is "C. I. 45380" or "C. I. 45160". Upon irradiation of only ultraviolet rays, the color of fluorescent light emitted from both the dyes ranges from yellow to orange. Under daylight, the color of fluorescent light emitted from both the dyes is red.

Note that a phosphor material used for the magenta fluorescent film section 12M may be a pink phosphor material. The phosphor material used for a pink fluorescent film section can be obtained by using a phosphor dye whose color index number is "C. I. 45170". Upon irradiation of only ultraviolet rays, the color of fluorescent light emitted from this dye ranges from orange to red. Under daylight, the color of fluorescent light emitted from the dye is pink.

In the arrangement shown in FIG. 7, while no voltage is applied between the pixel electrodes 3 and the counter electrode 13, light incident on the liquid crystal display device from the upper substrate 2 side is scattered and absorbed by the composite film 20, resulting in a dark display, as described above with reference to FIG. 4A.

While a voltage equal to or higher than a predetermined threshold value is applied between the pixel electrodes 3 and the counter electrode 13, light incident on the liquid crystal display device from the upper substrate 2 side is transmitted through the composite film 20 under no scattering/absorbing effect of the composite film 20, as described above with reference to FIG. 4B. This transmitted light is also transmitted through the pixel electrodes 3 and reaches the fluorescent films 12. As described with reference to FIG. 3, part of the light reaching each fluorescent film 12 causes it to emit fluorescent light. The light transmitted through the fluorescent film 12 is reflected by the reflecting film 15, and part of the reflected light causes the phosphor film 12 to emit fluorescent light. The light incident from the fluorescent film 12 on the gate insulating film 6 passes through the pixel electrode 3 to be incident on the composite film 20. The light then emerges from the upper substrate 2 under no influence of the scattering/absorbing effect of the composite film 20. Therefore, a bright point colored by the color of fluorescent light is displayed.

As described above, according to this embodiment, scattering and transmission of light are controlled by controlling a voltage applied between each pixel electrode 3 and the counter electrode 13, thereby displaying an arbitrary image. Similar to the first embodiment, a bright image can be displayed because there is no loss of light which is caused by light absorption in a polarizing plate or a color filter, and strong light including fluorescent light emitted from each fluorescent film 12 is used.

In the conventional active matrix liquid crystal display device, in order to increase the opening ratio of each pixel, a compensation capacitor is formed by arranging an edge portion of each pixel electrode and a corresponding capacitor forming electrode to oppose each other through an insulating film. For this reason, the area where each pixel electrode opposes a corresponding capacitor forming electrode is small, and hence the capacitance of each compensation capacitor is small. In the arrangement shown in FIG. 7, however, the reflecting film 15 opposing almost the entire surface of the pixel electrode 3 also serves as a capacitor forming electrode, and hence the capacitance of the compensation capacitor can be increased. Therefore, during a non-selection period of each pixel, a desired voltage can be stably held in the pixel to display an image without a "flicker".

In the arrangement shown in FIG. 7, the fluorescent film 12 is arranged on the reflecting film 15. However, as shown in FIG. 8, the fluorescent film 12 may be arranged on the transparent pixel electrode 3.

Figure 8:
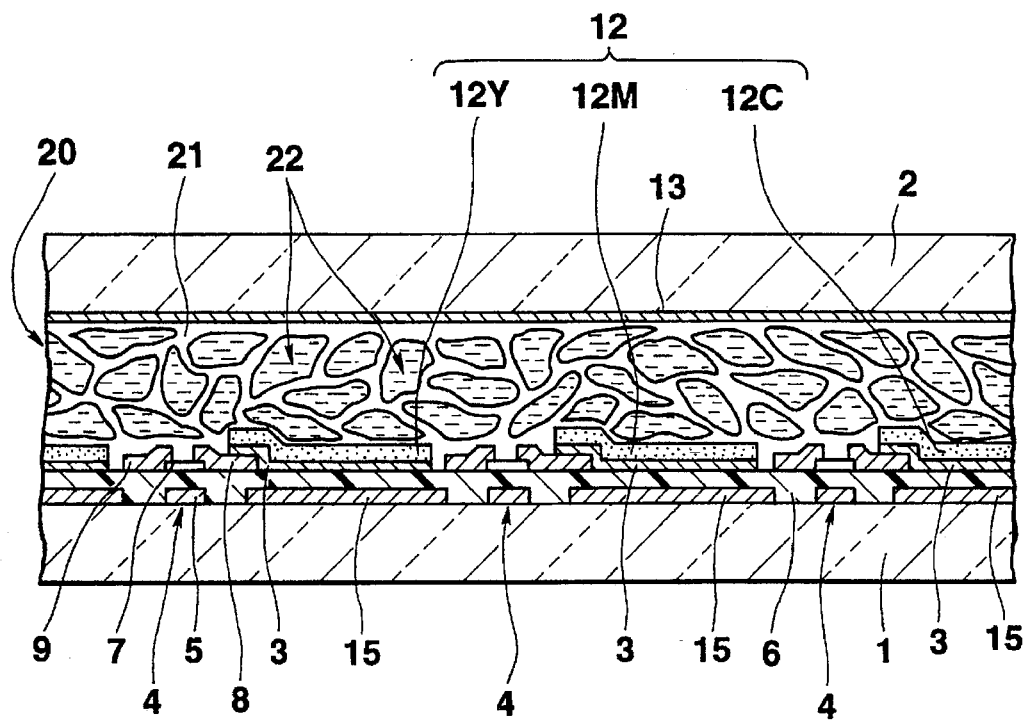
FIGS. 8 and 9 are sectional views respectively showing the arrangements of modifications of the reflection active matrix polymer dispersed color liquid crystal display device shown in FIG. 7.

According to the arrangement shown in FIG. 8, the distance between the pixel electrode 3 and the reflecting film 15 can be reduced to the thickness of the gate insulating film 6, and the compensation capacitor can be increased accordingly. In addition, a bright image similar to that obtained in the arrangement shown in FIG. 7 can be displayed.

In the arrangements shown in FIGS. 7 and 8, the reflecting film 15 is arranged on the lower substrate 1. However, as shown in FIG. 9, the reflecting film 15 may be formed on a protective insulating film 10.

Figure 9:
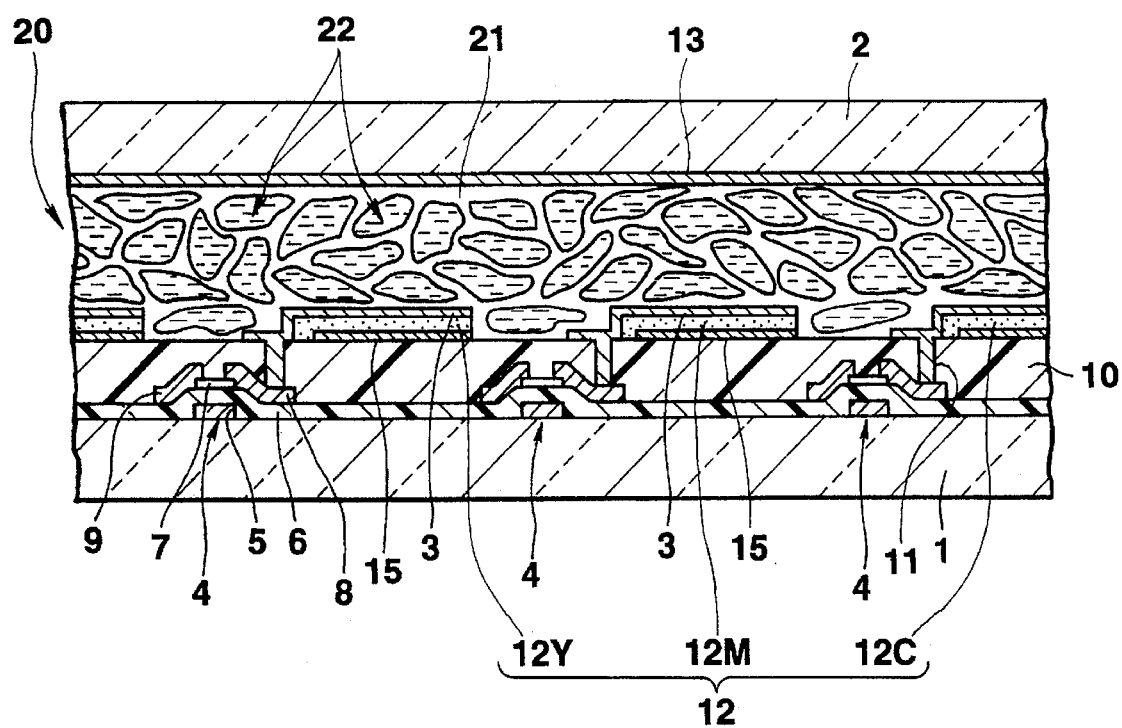

Referring to FIG. 9, the reflecting film 15 is formed on the protective insulating film 10, and the fluorescent film 12 is formed on the reflecting film 15. In addition, the transparent pixel electrode 3 is formed on the fluorescent film 12. According to this arrangement, by fixing the reflecting film 15 to a predetermined voltage, a compensation capacitor can be formed by the fluorescent film 12 between the pixel electrode 3 and the reflecting film 15. In this arrangement as well, a large compensation capacitor can be obtained.

(Third Embodiment)

In the first and second embodiments, the reflecting members (the pixel electrodes 3 in the first embodiment; the reflecting films 15 in the second embodiment) are arranged on the active element substrate on which the TFTs are formed. However, reflecting members may be arranged on a counter substrate on which a counter substrate electrode 13 is formed.

The third embodiment, in which reflecting members are formed on a counter substrate, will be described below.

Figure 10:
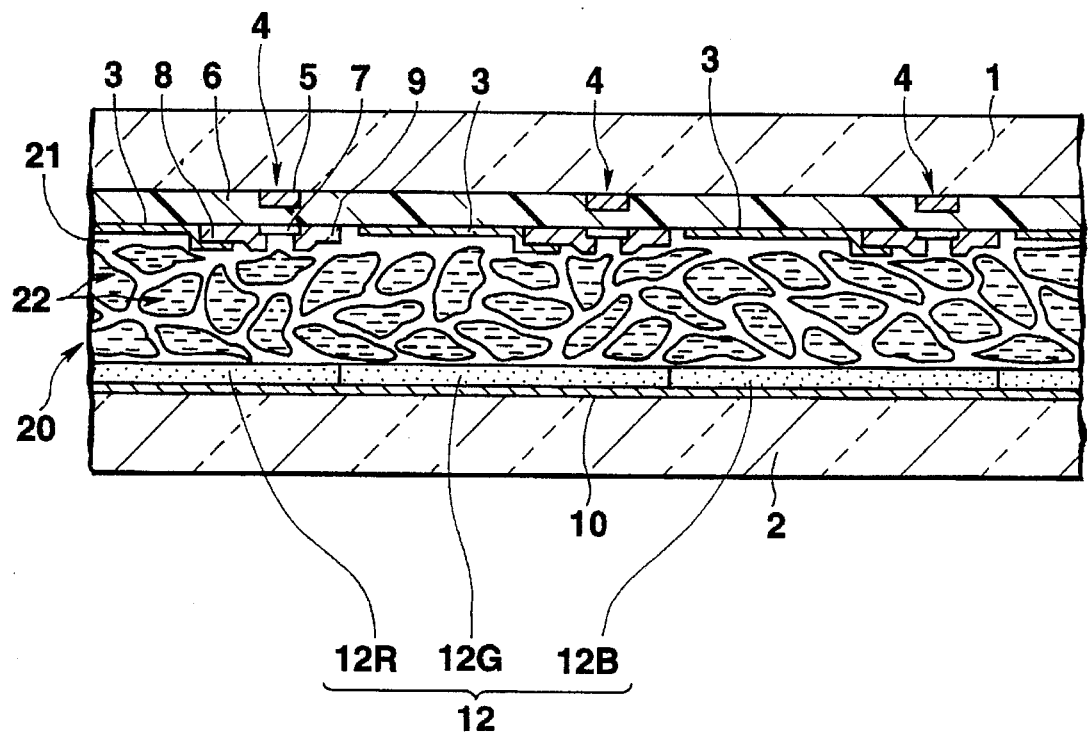
FIG. 10 is a sectional view showing the structure of the portion of a reflection active matrix color liquid crystal display device according to the third embodiment of the present invention.

FIG. 10 shows the arrangement of a liquid crystal display device according to the third embodiment of the present invention.

Referring to FIG. 10, TFTs 4 and pixel electrodes 3 are formed on a transparent upper substrate 1, and a counter electrode 13 made of a reflective, conductive material such as aluminum is formed on a lower substrate 2. R, G, and B fluorescent film sections 12R, 12B, and 12G are arranged on the counter electrode 13 in the form of a matrix.

In this arrangement, while no voltage is applied between each pixel electrode 3 and the counter electrode 13, light from the upper substrate 1 is incident on a composite film 20 through the pixel electrode 3. The light is then scattered and absorbed by the composite film 20, as described above with reference to FIG. 4A. As a result, the display becomes dark.

While a voltage equal to or higher than a predetermined threshold value is applied between each pixel electrode 3 and the counter electrode 13, light incident on the liquid crystal display device from the upper substrate 1 side is incident on the composite film 20 through the pixel electrode 3. As described above with reference to FIG. 4B, the light is then transmitted through the composite film 20 and reaches the fluorescent film 12 under no influence of the scattering/absorbing effect of the composite film 20. As described above with reference to FIG. 3, part of the light reaching the fluorescent film 12 (film sections 12R, 12B, and 12G) causes it to emit fluorescent light. The light passing through the fluorescent film 12 is reflected by the counter electrode 13. Part of the reflected light causes the fluorescent film 12 to emit fluorescent light. The light incident from the fluorescent film 12 on the composite film 20 passes through the composite film 20 and the pixel electrode 3 to emerge. Therefore, a bright display colored by the color of the fluorescent light emitted from the fluorescent film 12 can be obtained.

As described above, in this embodiment as well, an arbitrary image can be displayed by applying a voltage between each pixel electrode 3 and the counter electrode 13. Similar to the first and second embodiments, a bright image can be obtained because there is no loss of light which is caused by light absorption in a polarizing plate or a color filter and strong light including fluorescent light emitted from each fluorescent film 12 is used.

Figure 11:
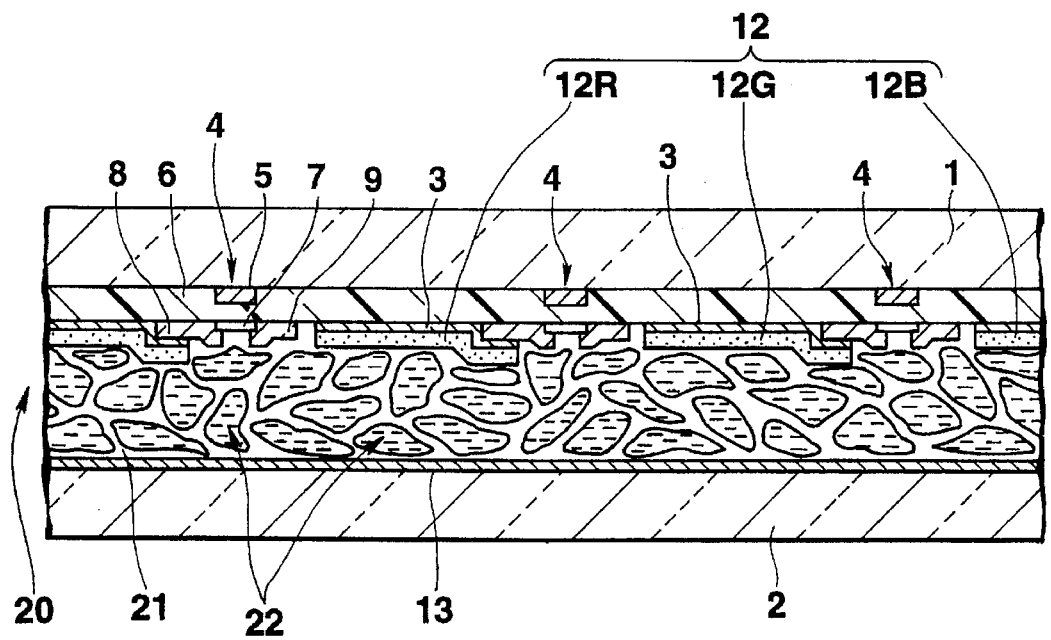
FIG. 11 is a sectional view showing the arrangement of a modification of the reflection active matrix polymer dispersed color liquid crystal display device shown in FIG. 10.

In the arrangement shown in FIG. 10, the fluorescent films 12 (film sections 12R, 12G, and 12B) is arranged on the counter electrode 13 serving also as a reflecting film. However, for example, as shown in FIG. 11, a fluorescent film 12 may be arranged on pixel electrodes 3.

In this case, similar to the arrangement shown in FIG. 6, fluorescent light from the fluorescent film 12 is observed during a dark display. However, by adjusting the ratio of a phosphor material 123 in the fluorescent film 12, the intensity of fluorescent light can be reduced to a predetermined level or lower at which no practical problems are posed.

(Fourth Embodiment)

The first to third embodiments exemplify the reflection active matrix color liquid crystal display device. However, the present invention can also be applied to a transmission active matrix liquid crystal display device.

Figure 12:
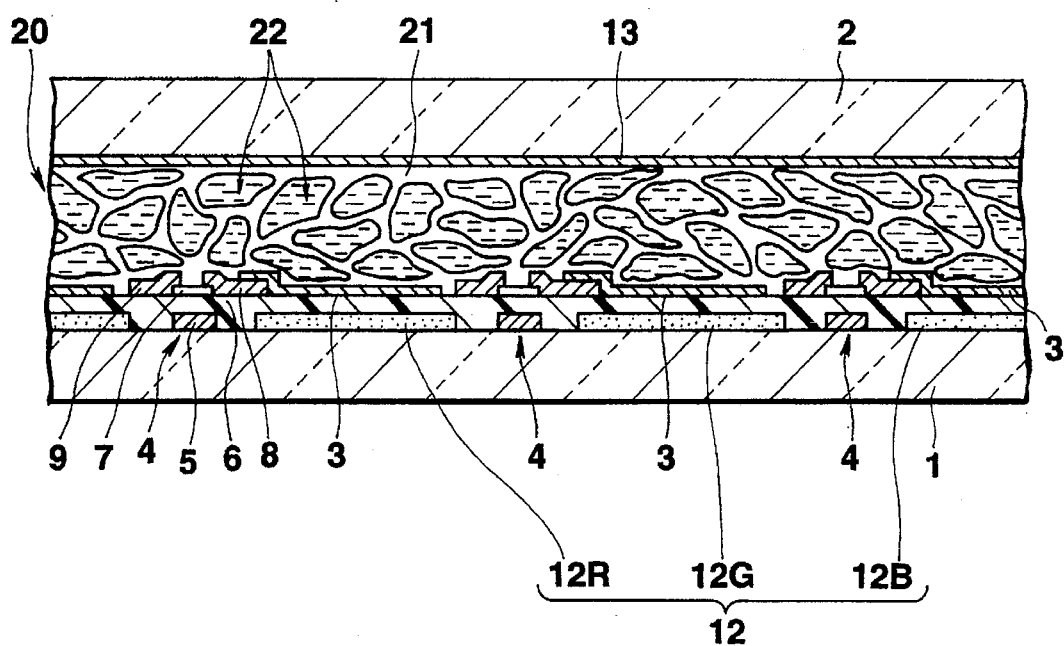
FIG. 12 is a sectional view showing the structure of the portion of a transmission active matrix color liquid crystal display device according to the fourth embodiment of the present invention.

FIG. 12 shows a transmission liquid crystal display device using a fluorescent film 12.

The arrangement shown in FIG. 12 is almost the same as that shown in FIG. 7 except that no reflecting film 15 is arranged.

In this transmission liquid crystal display device, the fluorescent film 12 is formed on a lower substrate 1, and transparent pixel electrodes 3 are arranged to oppose the fluorescent films 12 via a gate insulating film 6.

According to this arrangement, for example, light incident from the lower side of the drawing is colored by fluorescent light when it is transmitted through the fluorescent film 12, as described above with reference to FIG. 3. The colored light then passes through each pixel electrode 3 to be incident on a composite film 20. The light incident on the composite film 20 is scattered and absorbed by the composite film 20 or transmitted through the composite film 20 to emerge from the upper substrate 2 in accordance with the aligned states of liquid crystal molecule MA and a dichroic dye MB, which states correspond to the voltage applied between each pixel electrode 3 and a counter electrode 13.

While a voltage is applied between each pixel electrode 3 and the counter electrode 13, high-luminance colored light including fluorescent light emitted from the fluorescent film 12 is output from the upper substrate 2. Therefore, a bright display is obtained, and the contrast of a displayed image is high.

In the above description, light is incident from the lower substrate 1, and a displayed image is observed from the upper substrate 2. Even if, however, light is incident from the upper substrate 2, and an image is observed from the lower substrate 1 side, a bright image having high contrast can be observed. Note that since fluorescent light from the fluorescent film 12 may be observed in a dark display operation, the concentration of a phosphor material 123 in each fluorescent film 12 needs to be properly set.

In the arrangement shown in FIG. 12, the pixel electrodes 3 are arranged on the lower substrate 1. However, for example, as shown in FIGS. 13 and 14, the fluorescent film 12 may be arranged on or under the pixel electrodes 3.

Figure 13:
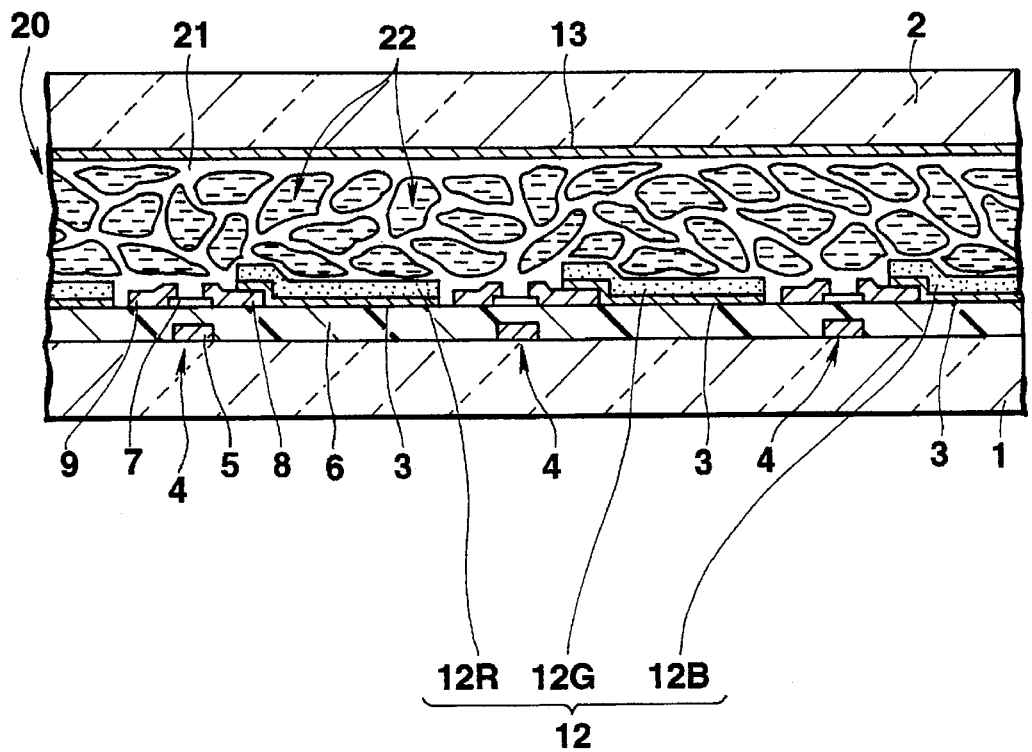
FIGS. 13 to 15 are sectional views respectively showing the arrangements of various modifications of the transmission active matrix polymer dispersed color liquid crystal display device shown in FIG. 12.

In the arrangement shown in FIG. 13, the fluorescent film 12 (film sections 12R, 12G, and 12B) is arranged on the transparent pixel electrodes 3 formed on the gate insulating film 6. This arrangement corresponds to an arrangement obtained by omitting the reflecting films 15 from the arrangement shown in FIG. 8 or an arrangement obtained by forming a transparent electrode as the counter electrode 13 in the arrangement shown in FIG. 11.

Figure 14:
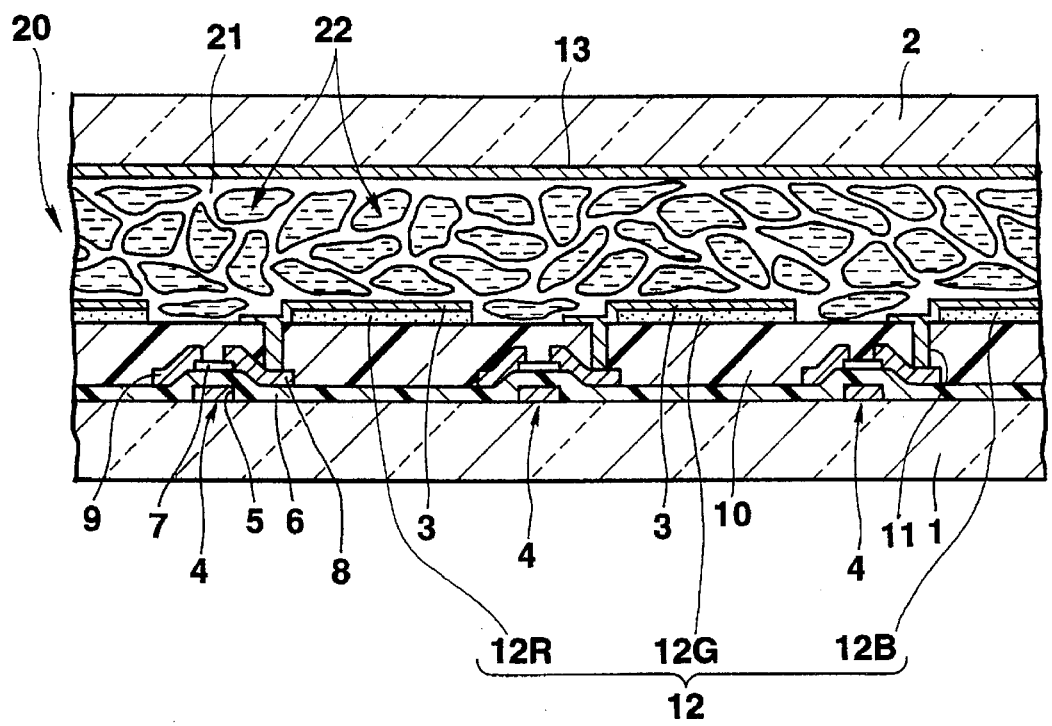

In the arrangement shown in FIG. 14, the fluorescent film 12 (film sections 12R, 12G, and 12B) is formed on protective insulating films 10 formed on TFTs 4, and the pixel electrodes 3 are formed on the fluorescent film 12. The pixel electrodes 3 are connected to source electro-des 8 of the TFTs 4 via contact holes 11 formed in the protective insulating films 10. This arrangement corresponds to a structure obtained by omitting the reflecting films 15 from the arrangement shown in FIG. 9.

Figure 15:
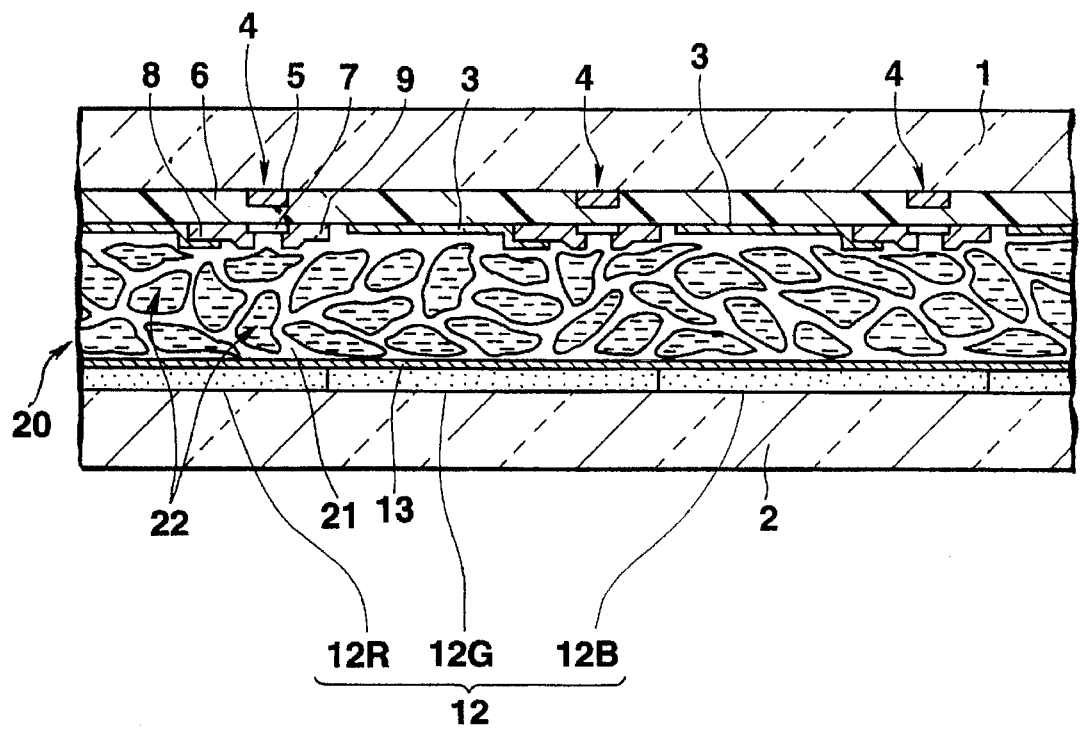

As shown in FIG. 15, the fluorescent film 12 (film sections 12R, 12G, and 12B) may by arranged between the transparent counter electrode 13 and the lower substrate 1. Similarly, by forming the counter electrode 13 of the liquid crystal display device using a transparent conductive material, a transmission liquid crystal display device having the fluorescent film 12 formed on the counter electrode 13 may be formed.

(Fifth Embodiment)

The first to third embodiments exemplify the arrangement having the reflecting films between the substrates 1 and 2, i.e., in the liquid crystal cell. However, the present invention is not limited to the above embodiments. A reflecting film may be arranged outside the substrates 1 and 2, i.e., outside the liquid crystal cell.

Figure 16:
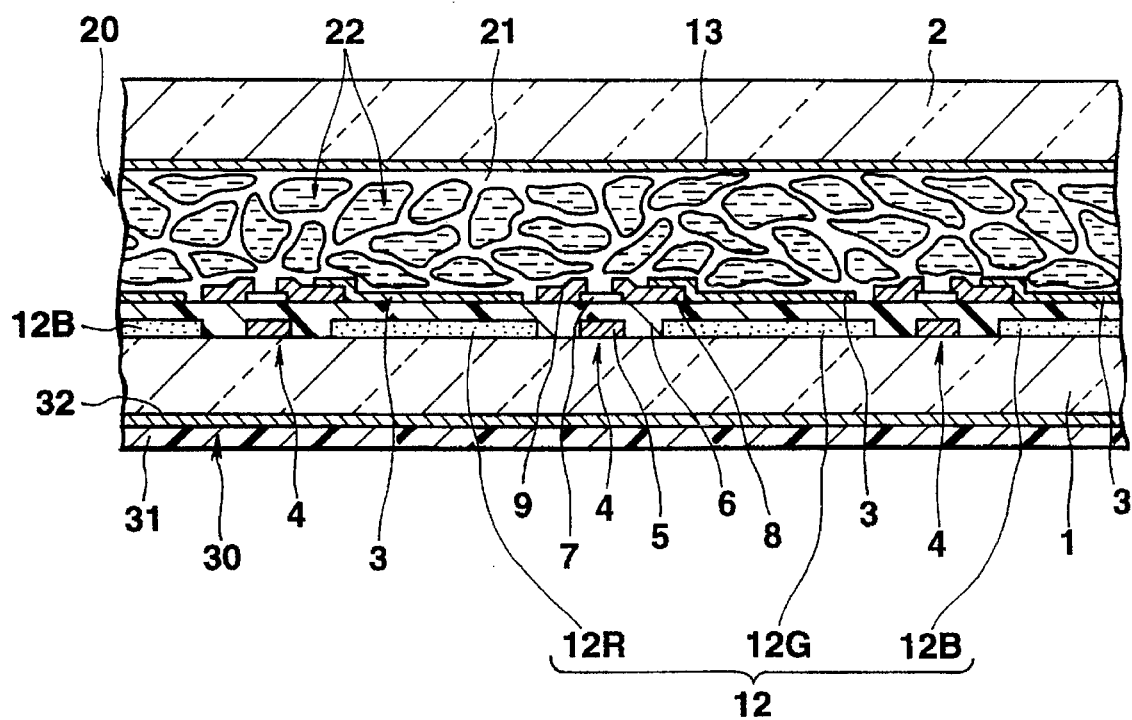
FIG. 16 is a sectional view showing the structure of the portion of a reflection active matrix color liquid crystal display device according to the fifth embodiment of the present invention.

FIG. 16 shows such an arrangement, in which a reflecting film is arranged outside a lower substrate 1 on which TFTs 4 are formed.

In the arrangement shown in FIG. 16, each of the substrate 1 and a substrate 2 is constituted by a transparent substrate, and each of pixel electrodes 3 and a counter electrode 13 is made of a transparent conductive film consisting of ITO or the like. A reflecting plate 30 is arranged outside the lower substrate 1. The reflecting plate 30 is constituted by a base sheet 31 consisting of a resin film and a reflecting film 32 formed thereon to face the substrate. The reflecting film 32 is made of an aluminum reflecting film having a roughened-surface reflecting, a white reflecting film having a light-scattering surface consisting of $BaSO_4$, or a mirror-surface reflecting film consisting of silver.

In this arrangement, while no voltage is applied between the pixel electrodes 3 and the counter electrode 13, most of light incident on a composite film 20 from the front-surface substrate 2 is scattered and absorbed by the composite film 20. In addition, light transmitted through the composite film 20 is reflected by the reflecting film 32 and scattered and absorbed by the composite film 20 again. For this reason, the display becomes dark.

While a voltage is applied between the pixel electrodes 3 and the counter electrode 13, light incident from the upper substrate 2 on the composite film 20 is transmitted through the composite film 20 and the pixel electrodes 3 and reaches a fluorescent film 12. Part of the light reaching the fluorescent film 12 causes the fluorescent film 12 to emit fluorescent light. Of the light transmitted through the fluorescent film 12 and the fluorescent light emitted therefrom, light components directed to the reflecting film 32 are transmitted through the lower substrate 1 and reflected by the reflecting film 32. The light components are then transmitted through the fluorescent film 12 and the pixel electrodes 3 and are also transmitted through the composite film 20 to emerge from the upper substrate 2.

With such an arrangement as well, therefore, a bright image can be displayed by using fluorescent light, similar to the first to third embodiments.

Note that even if the reflecting plate 30 is arranged on the upper substrate 2 side, and a displayed image is observed from the lower substrate 1 side, the substantially same effect as that described above can be obtained.

The present invention is not limited to the arrangement shown in FIG. 16. Even if the reflecting plate 30 is arranged on the outer surface of the substrate 1 or 2 of each of the transmission liquid crystal display devices having the arrangements shown in FIGS. 11 to 15, a reflection liquid crystal display device having the same effect as described above can be obtained.

(Sixth Embodiment)

Figure 17:
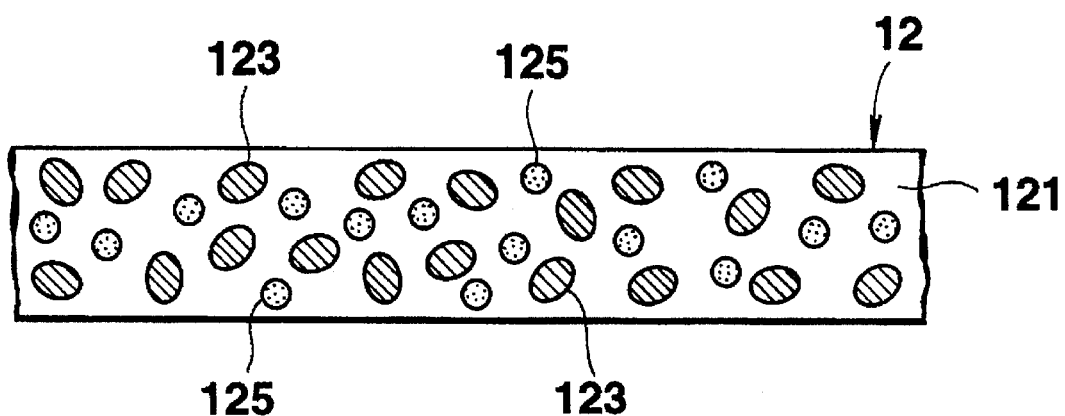
FIG. 17 is a sectional view for explaining a fluorescent film containing a coloring pigment.

In the first to fifth embodiments, the fluorescent film 12 is constituted by the resin base member 121 and the phosphor member 123. However, as shown in FIG. 17, a coloring pigment (a pigment used for a color filter or the like) 125 for transmitting light corresponding to the wavelength range of fluorescent light emitted from a phosphor material 123 and absorbing light having other wavelength ranges may be added into fluorescent film 12. With this process, the color purity of light emerging from the fluorescent film 12 can be improved.

The fluorescent film 12 having such an arrangement is formed as follows. For example, a mixture of a resin material for a base material 121, the phosphor material 123, and a coloring pigment are coated on a substrate or the like by printing or spin-coating to have a predetermined film thickness. Thereafter, the resin material is hardened to form each fluorescent film section.

When the color pigment 125 is added to the fluorescent film 12, light transmitted through the fluorescent film 12 is absorbed by the coloring pigment 125 to a certain extent. Therefore, the intensity of exit light is decreased by the amount of light absorbed. However, colored light having a sufficient intensity and a high color impurity can be obtained by adjusting the amount of the coloring pigment 125 added.

(Seventh Embodiment)

Figure 18:
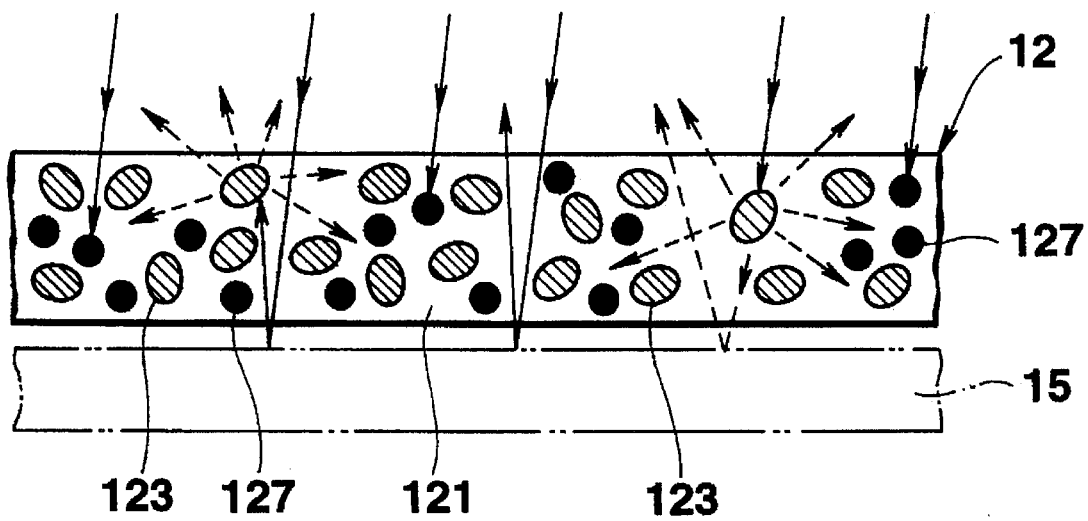
FIGS. 18 to 20 are sectional views for explaining a fluorescent film containing a phosphorescent material.

As shown in FIG. 18, a phosphorescent material 127 may be added to a fluorescent film 12 in each of the first to fifth embodiments.

The phosphorescent material 127 consists of a zinc sulfate powder, a calcium sulfate powder, or the like used for a luminous paint. The phosphorescent material 127 absorbs externally radiated light, accumulates the excited energy, and gradually converts the accumulated energy into light, thereby emitting the light.

Each fluorescent film 12 shown in FIG. 18 is formed as follows. For example, a material obtained by mixing a resin material for a base material 121 and a phosphor material 123 at a predetermined ratio is coated on a substrate or the like by printing or spin-coating to have a predetermined film thickness. The resin material is then hardened to form the fluorescent film 12.

As illustrated in FIG. 18, part of light incident from the upper surface side of the fluorescent film 12 and light reflected by a reflecting film 15 (or a reflective electrode or a reflecting film 32) is absorbed by the phosphorescent material 127 when it passes through the fluorescent film 12, and the energy of the absorbed light is accumulated in the phosphorescent material 127. The phosphorescent material 127 converts the accumulated energy into light and emits the light. While a sufficient amount of light is incident on the fluorescent film 12, since the amount of light absorbed by the phosphorescent material 127 is larger than the amount of light emitted, the phosphorescent material 127 accumulates optical energy until the material is saturated. In this case, since the phosphor material 123 receives strong external light and emits strong fluorescent light, light emitted from the phosphorescent material 127 is hardly observed.

Figure 19:
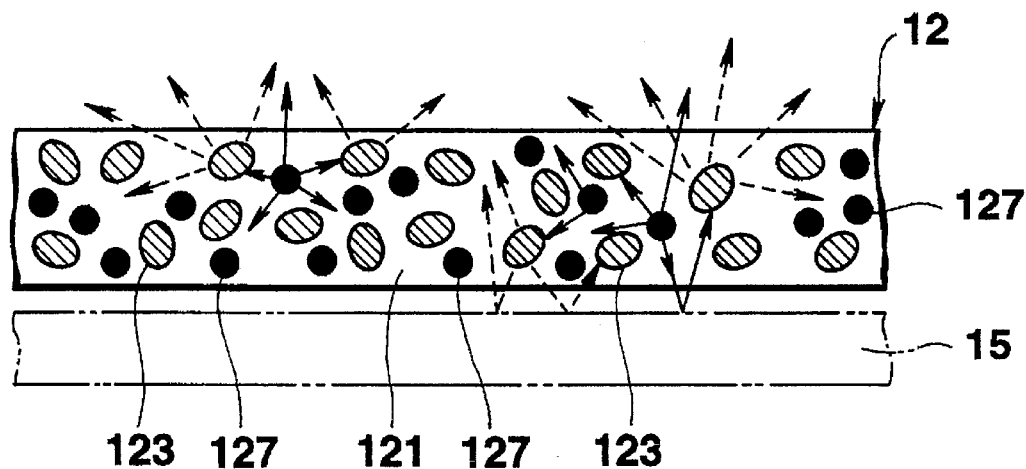

When it becomes dark around the display device, and almost no light is incident on the fluorescent film 12, the phosphorescent material 127 keeps emitting light until no accumulated energy is left, as illustrated in FIG. 19. All or part of the light emitted from the phosphorescent material 127 collides against the phosphor material 123. The phosphor material 123 transmits or reflects light components, of the light which has collided against the phosphor material 123, which have a specific wavelength range, and absorbs light components having other wavelength ranges, thereby emitting fluorescent light with the specific wavelength range by using the energy of the absorbed light components. For this reason, the light emerging from the fluorescent film 12 has a color equal to that of the fluorescent light emitted from the phosphor material 123. In addition, a display using the color of light emitted from the phosphorescent material 127 or a display using a color mixture of the color of fluorescent light emitted from the phosphor material 123 and the color of light emitted from the phosphorescent material 127 can be obtained in accordance with the concentrations of the phosphor material 123 and the phosphorescent material 127.

The intensity of light emerging from the fluorescent film 12 is considerably lower than that of exit light obtained when a sufficient amount of external light is incident on the fluorescent film 12. However, by selecting a proper amount of the phosphorescent material 127 mixed in the fluorescent film 12, colored light which is bright enough to be recognized in practice can be obtained.

That is, by mixing the phosphorescent material 127 into the fluorescent film 12, even after light ceases to be incident on the liquid crystal display device, the device is capable of a color display using colored fluorescent light emitted from the fluorescent film 12.

Figure 20:
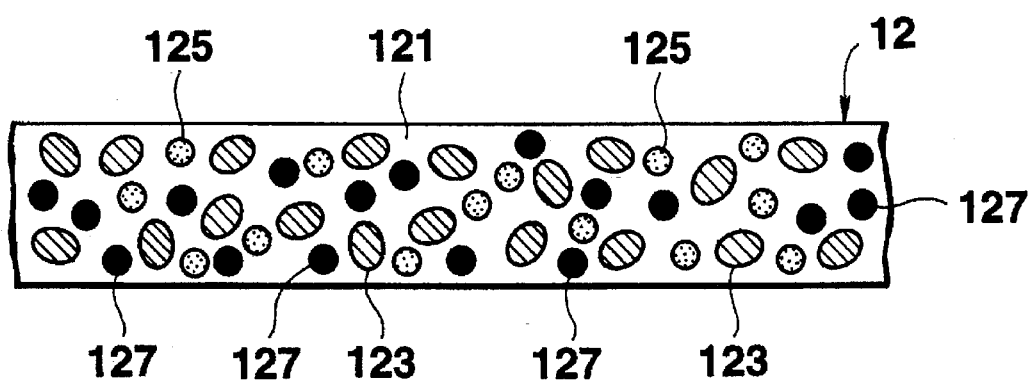

Note that a coloring pigment 125 may be added to a fluorescent film 12, together with a phosphorescent material 127, as shown in FIG. 20.

(Eighth Embodiment)

In each of the arrangements shown in FIGS. 1, 6, 8, 10, 11, and 13, each pixel electrode 3 or the counter electrode 13 is in contact with the composite film 20 via the fluorescent film 12 as an insulating member. When a voltage is applied between the pixel electrode 3 and the counter electrode 13, the applied voltage is divided by the fluorescent film 12 and the composite film 20. Since the fluorescent film 12 is an insulating member, a large voltage drop occurs therein. As a result, the electric field applied to the liquid crystal 22 reduces. Therefore, the driving voltage must be increased to ensure alignment of the liquid crystal molecules MA and the dichroic dye MB.

Figure 21:
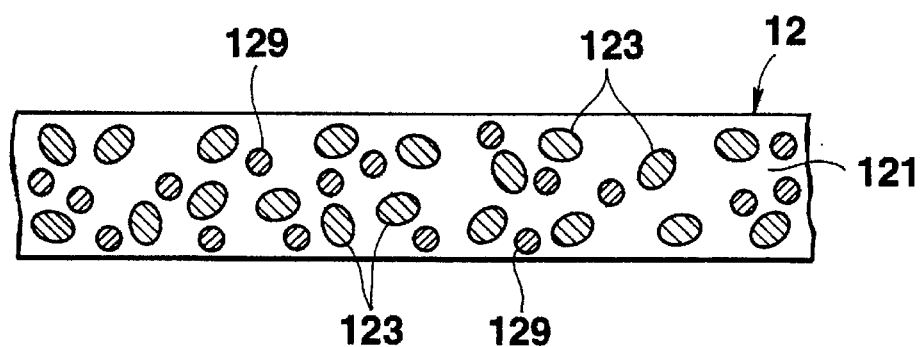
FIG. 21 is a sectional view for explaining a fluorescent film containing a conductive dopant.

In order to solve such a problem, the resistivity of the fluorescent film 12 may be decreased. In order to decrease the resistivity of the fluorescent film 12, a con-ductive dopant 129 may be added to the fluorescent film 12, as shown in FIG. 21.

By adding the conductive dopant 129, the resistivity of a fluorescent film 12 is decreased, and the voltage drop in the fluorescent film 12 can be suppressed to a small value. As a result, a voltage almost equal to the voltage between each pixel electrode 3 and a counter electrode 13 is applied to a composite film 20. Therefore, the liquid crystal display device can be driven by a relatively low driving voltage.

For example, in the arrangements shown in FIG. 12 and 16, by decreasing the resistivity of the fluorescent film 12, a compensation capacitor can be formed by the pixel electrode 3, the fluorescent film 12 and the part gate insulating film 6 therebetween.

As dopants, the following can be used:

an alkaline metal such as Li, Na, K, or Cs;

an alkylammonium ion such as tetraethyl ammonium (TEA*) or tetrabutyl ammonium (TBuA*);

a halogen such as $Br_2$, $I_2$, or $Cl_2$;

a Lewis acid such as $BF_3$, $PF_5$, $AsF_5$, $SbF_5$, or $SO_3$;

a protonic acid such as $HNO_3$, $H_2SO_4$, $HClO_4$, HF, HCl, $FSO_3H$, or $CF_3SO_3H$;

a transition metal halide such as $FeCl_3$, $MoCl_5$, $WCl_5$, $SnCl_4$, $MoF_5$, $RuF_5$, $TaBr_5$, or $SnI_4$;

an organic substance such as TCNE, TCNQ, or chloranil; and a charge-transfer complex such as N-methylphenadium-tetracyanodimethane complex.

These dopants 129 are used singly or in a combination of a plurality of dopants. The dopant 129 is added in an amount by which the transparency of the resin base member 121 does not deteriorates very much and the resistivity of the resin base member 121 can be sufficiently decreased.

The fluorescent film 12 containing the conductive dopant 129 is formed as follows. For example, a resin material containing predetermined amounts of the phosphor material 123 and the conductive dopant 129 is coated on a substrate or the like by printing or spin-coating. The resin material is then hardened to form the fluorescent film 12.

(Modification)

In the first to fifth embodiments, fluorescent film for emitting fluorescent light of three colors is arranged to display a color image. However, the present invention is not limited to this. The fluorescent film 12 for emitting monochrome fluorescent light may be arranged. In this case, although a color image cannot be displayed, a bright monochrome image can be displayed using fluorescent light.

The active element 4 is not limited to a TFT but may be an MIM or the like.

In the above embodiments, a dichroic black dye is added to the liquid crystal 22. However, a dichroic dye of a different color may be added. Alternatively, any dichroic dye need not be added to the liquid crystal 22. In this case as well, light is scattered by the composite film 20 in the absence of an electric field, and light is transmitted therethrough in the presence of an electric field. With this operation, an image can be displayed.

In the above embodiments, the polymer dispersed liquid crystal layer or composite film 20 is formed by phase-separation of the polymer resin 21 and the liquid crystal 22. However, for example, a polymer dispersed liquid crystal layer may be formed as follows. Liquid crystal microcapsules are dispersed in a resin material and arranged between substrates. The resin material is hardened to form the polymer dispersed liquid crystal layer.

In the above embodiments, as the liquid crystal 22 of the composite film 20 of the polymer resin and the liquid crystal, a nematic liquid crystal having positive dielectric anisotropy is used. However, a cholesteric liquid crystal may be used. The cholesteric liquid crystal has a helical molecular alignment structure in the absence of an electric field, and hence has a light-scattering property superior to that of a nematic liquid crystal. Therefore, the dark display can be made darker to improve the contrast of the display.

Figure 22:
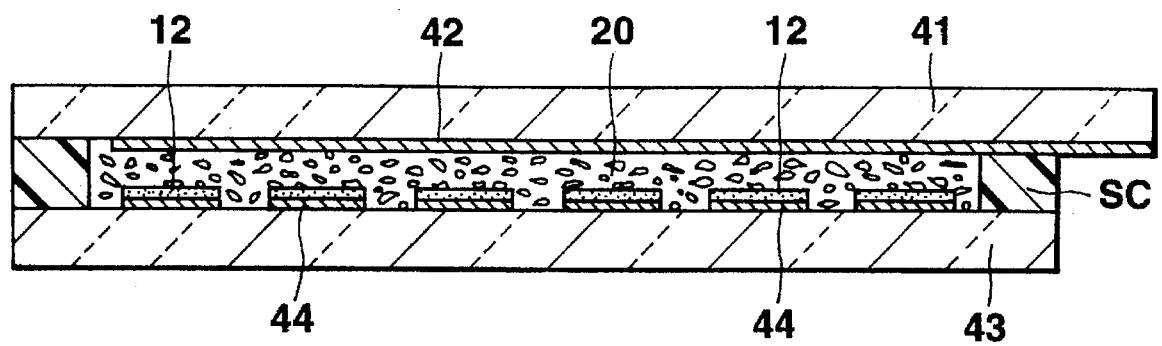
FIG. 22 is a sectional view showing a simple matrix polymer dispersed liquid crystal display device.

The above embodiments have exemplified the active matrix liquid crystal devices to explain the present invention. The present invention can be applied to a polymer dispersed liquid crystal device of a simple matrix type. In this case, for example, as shown in FIG. 22, the fluorescent film 12 is arranged on the intersections between common electrodes 42 formed on one substrate 41 and segment electrodes 44 formed on the other substrate 43.

In addition, the fluorescent film 12 is not limited to a polymer dispersed liquid crystal display device, but may be applied as a coloring film for a TN liquid crystal display device, an STN liquid crystal display device, a ferroelectric liquid crystal display device, an antiferroelectric liquid crystal display device, or the like.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A polymer dispersed liquid crystal device comprising:
   a first substrate on which active elements and pixel electrodes connected thereto are arranged in the form of a matrix;

a second substrate having a counter electrode formed thereon and arranged to oppose said first substrate;

a polymer dispersed liquid crystal layer arranged between said first substrate and said second substrate and having a composite layer formed by dispersing a polymer resin and a liquid crystal;

a fluorescent film arranged on said first substrate to correspond to said pixel electrode, for emitting light with a specific wavelength range by the energy of absorbed light passing through said polymer dispersed liquid crystal layer; and a reflecting means, arranged on a side of said first substrate which is opposed to said second substrate which is irradiated with incident light, for reflecting at least one of light passing through said polymer dispersed liquid crystal layer and light emitted from said fluorescent film.

2. A device according to claim 1, wherein said fluorescent film contains at least one of a pigment and a phosphorescent material.

3. A device according to claim 1, wherein said fluorescent film contains a conductive dopant for reducing a resistivity of said fluorescent film.

4. A device according to claim 1, wherein said fluorescent film includes a plurality of fluorescent film sections for emitting fluorescent light of different colors to color light in a plurality of colors, said plurality of fluorescent film sections for emitting the fluorescent light of the different colors being sequentially and regularly arranged to oppose said pixel electrodes.

5. A device according to claim 1, wherein said fluorescent film is formed on said pixel electrodes.

6. A device according to claim 1, wherein said fluorescent film is formed between said pixel electrodes and said first substrate.

7. A device according to claim 1, wherein each of said first substrate, said second substrate, said pixel electrodes, and said counter electrode is made of a light-transmitting material.

8. A device according to claim 1, wherein said reflecting means is arranged outside of said first substrate which is opposed to said second substrate.

9. A device according to claim 1, wherein said reflecting means is arranged between said first substrate and said second substrate.

10. A device according to claim 1, wherein said reflecting means is arranged between said pixel electrode and said first substrate.

11. A device according to claim 10, wherein said fluorescent film is arranged between said reflecting means and said pixel electrodes.

12. A device according to claim 10, wherein said fluorescent film is arranged on an opposite surfaces of said pixel electrodes to a surface thereof on which said reflecting means is arranged.

13. A device according to claim 10, wherein said reflecting means is formed on an insulating film formed on said first substrate, said fluorescent film is formed on said reflecting means, and said pixel electrode is formed on said fluorescent film.

14. A device according to claim 1, wherein each of said pixel electrodes is made of a reflective, conductive material and reflects radiated light.

15. A device according to claim 14, wherein said fluorescent film is formed on said pixel electrodes.

16. A device according to claim 1, wherein said liquid crystal contains a dichroic dye.

17. A liquid crystal device comprising:

a first substrate;

a first electrode formed on a side of an inner surface of said first substrate;

a second substrate arranged to oppose said first substrate;

a second electrode arranged on an inner surface of said second substrate to oppose said first electrode;

light control means, arranged between said first and second substrates, for displaying an image by controlling scattering and transmission of incident light in accordance with a voltage applied between said first electrode and said second electrode;

fluorescent means, arranged between said first electrode and said first substrate, for absorbing light passing through said light control means and emitting fluorescent light by the energy of the absorbed light to supply light for image display to said light control means; and a reflecting means, arranged between said fluorescent means and said first substrate which is opposed to the substrate which is irradiated with incident light, for reflecting the fluorescent light emitted from said fluorescent means.

18. A device according to claim 17, wherein said light control means includes means for absorbing light upon scattering of incident light, and said fluorescent means provides said light control means with fluorescent light of different colors, thereby displaying a color image.

19. A polymer dispersed light crystal device comprising:

a first substrate on which active elements and pixel electrodes connected thereto are arranged in the form of a matrix;

a second substrate having a counter electrode formed thereon and arranged to oppose said first substrate;

a polymer dispersed liquid crystal layer arranged between said first substrate and said second substrate and having a composite layer formed by dispersing a polymer resin and a liquid crystal;

a fluorescent resin film arranged on said second substrate to correspond to said pixel electrode, for emitting light with a specific wavelength range by the energy of absorbed light passing through said polymer dispersed liquid crystal layer; and a reflecting means, arranged on a side of one of said first substrate and said second substrate which is opposed to the substrate which is irradiated with incident light, for reflecting at least one of light passing through said polymer dispersed liquid crystal layer and light emitted from said fluorescent film.

20. A device according to claim 19, wherein each of said first substrate, said second substrate, said pixel electrodes, and said counter electrode is made of a light-transmitting material.

21. A device according to claim 19, wherein said counter electrode is made of a reflective, conductive material and reflects radiated light.

* * * * *